United States Patent
Kim

(10) Patent No.: US 8,914,823 B2
(45) Date of Patent: Dec. 16, 2014

(54) A/V PARENTAL LOCK APPARATUS AND METHOD

(75) Inventor: Jae Joo Kim, Sungnam-si (KR)

(73) Assignee: Humax, Co., Ltd., Yougin, Kyonggi-Do (KR)

( * ) Notice: Subject to any disclaimer, the term of this patent is extended or adjusted under 35 U.S.C. 154(b) by 1022 days.

(21) Appl. No.: 11/338,884

(22) Filed: Jan. 25, 2006

(65) Prior Publication Data

US 2006/0190962 A1    Aug. 24, 2006

(30) Foreign Application Priority Data

Jan. 26, 2005  (KR) .................. 10-2005-0007160

(51) Int. Cl.
| | |
|---|---|
| H04N 7/167 | (2011.01) |
| H04N 7/088 | (2006.01) |
| H04N 21/442 | (2011.01) |
| H04N 21/45 | (2011.01) |
| H04N 21/454 | (2011.01) |
| H04N 21/475 | (2011.01) |
| H04N 7/16 | (2011.01) |

(52) U.S. Cl.
CPC ............. *H04N 7/0887* (2013.01); *H04N 7/163* (2013.01); *H04N 21/44213* (2013.01); *H04N 21/4532* (2013.01); *H04N 21/4542* (2013.01); *H04N 21/4751* (2013.01)
USPC .......................................................... 725/31

(58) Field of Classification Search
USPC ............................................. 725/2, 20, 25–31
See application file for complete search history.

(56) References Cited

U.S. PATENT DOCUMENTS

| | | | |
|---|---|---|---|
| 7,380,258 B2* | 5/2008 | Durden et al. ................... | 725/25 |
| 2005/0268317 A1* | 12/2005 | Cormack et al. ................ | 725/25 |

FOREIGN PATENT DOCUMENTS

KR    10-1998-076217    11/1998

OTHER PUBLICATIONS

Korean Office Action dated Aug. 4, 2006.

* cited by examiner

*Primary Examiner* — Dennis Joseph
(74) *Attorney, Agent, or Firm* — Lowe Hauptman & Ham, LLP

(57) ABSTRACT

Provided are an apparatus and method for restricting A/V listening and viewing using parental levels. According to an embodiment of the present invention, a parental level detected from a video signal is compared with a level set by a user, and previously buffered video and audio are repeatedly output if the detected parental level is higher than the level set by the user. The parental level is included and transmitted in a video line of a broadcast signal. Also, the repeatedly output video is a still image or a moving image, and the repeatedly output audio is audio between two audio mute periods finally detected. Accordingly, there is no case when a user waits for nothing while viewing a black screen in a mute state, while a parental lock operation is performed.

8 Claims, 6 Drawing Sheets

| Data | bit 7 | bit 6 | bit 5 | bit 4 | bit 3 | bit 2 | bit 1 | bit 0 |
|---|---|---|---|---|---|---|---|---|
| Rating | P | 1 | - | - | A0 | R2 | R1 | R0 |
| Advisory | P | 1 | V1 | V0 | S1 | S0 | I1 | I0 |

| | | | |
|---|---|---|---|
| A0 | 1/0 | Content advisory character exist (1) or not (0) | |
| R2/R1/R0 | 0/0/0 | N/A | MPAA film Rating |
| | 0/0/1 | G | |
| | 0/1/0 | P | |
| | 0/1/1 | PG13 | |
| | 1/0/0 | R | |
| | 1/0/1 | NC-17 | |
| | 1/1/0 | X | |
| | 1/1/1 | Not Rated | |
| V1/V0 | 0/0 | No Violent content | Violent Level |
| | 0/1 | V1 | |
| | 1/0 | V2 | |
| | 1/1 | V3 | |
| S1/S0 | 0/0 | No sexual content | Sexual Level |
| | 0/1 | S1 | |
| | 1/0 | S2 | |
| | 1/1 | S3 | |
| I1/I0 | 0/0 | No adult content | Advisory Level |
| | 0/1 | L1 | |
| | 1/0 | L2 | |
| | 1/1 | L3 | |

A/V PARENTAL LOCK APPARATUS AND METHOD

BACKGROUND OF THE INVENTION

1. Field of the Invention

The present invention relates to a method and apparatus for restricting A/V listening and viewing using parental levels.

2. Description of the Related Art

Recently, a parental lock function for blocking children or juveniles from listening and viewing adult programs, etc. without permission is being applied to various devices, such as a set top box, etc.

A broadcast receiver having a parental lock function, as illustrated in FIG. 1, includes an A/V signal processor 10, a parental level detecting unit 11, a microprocessor 12, a memory 13, etc.

The memory 13 stores and manages user setting parental level information User_Set_Parental_Level set by a user. The parental level detecting unit 11 detects parental level information included in specific lines of video signals among broadcast signals received through the A/V signal processor 10.

For example, as illustrated in FIG. 2, a vertical blank period of a 21-th video line in a $2^{ND}$ field of a NTSC broadcast signal transmits data 1 and data 2, each data having 2 bytes, as parental level information for parental lock. The parental level information can be called an arbitrary different name, such as parental lock information, etc.

Also, as illustrated in FIG. 3, the parental level information includes ratings on broadcast programs classified on the basis of film ratings, violent levels, sexual levels, and advisory levels of the classification board within the Motion Picture Association of America (MPAA). The parental level detecting unit 111 detects the parental level information included and transmitted in a video line as described above and outputs the parental level information to the microprocessor 12.

The microprocessor 12 compares the parental level detected by the parental level detecting unit 11 with a user setting parental level stored in the memory 13, and determines whether or not to output video and audio of the currently received broadcast program according to the comparison result.

For example, as illustrated in FIG. 4, if the detected parental level is an adult level higher than the user setting parental level, the microprocessor 12 controls the A/V signal processor 10 so that the video and audio of the received broadcast program are not output, and displays a black screen in a mute state.

Meanwhile, if the parental level detected by the parental level detecting unit 11 is lower than the user setting parental level, for example, if the parental level is not the adult level, the microprocessor 12 controls the A/V signal processor 10 so that the video and audio of the received broadcast program are normally output.

Accordingly, it is possible to block video and audio containing inappropriate content for children or juveniles from being output without permission. However, in this case, users should wait for nothing while a black screen is displayed in a mute state.

SUMMARY OF THE INVENTION

To resolve the problem described above, there is provided a method and apparatus for providing video and audio instead of broadcast programs which are not output according to parental levels set by a user.

According to an aspect of the present invention, there is provided an A/V parental lock method including: comparing a parental level detected from a video signal with a level set by a user; and if the detected parental level is higher than the level set by the user according to the comparison result, repeatedly outputting predetermined video.

According to another aspect of the present invention, there is provided an A/V parental lock apparatus including: a parental level information detecting unit detecting a parental level included in a video signal; a storage unit temporarily storing a part of video; and a control unit repeatedly outputting the part of the video temporarily stored in the storage unit if the detected parental level is higher than a level set by a user.

Preferably, the parental level is included and transmitted in a video line of a broadcast signal.

Preferably, the repeatedly output video is a previously buffered still image or a previously buffered moving image. Also, if the detected parental level is higher than the level set by the user, previously buffered audio can be repeatedly output.

Preferably, if the detected parental level is lower than the level set by the user, a currently output video frame and audio between two audio mute periods finally detected are buffered.

Preferably, if a parental level lower than the level set by the user is detected while the part of the video is repeatedly output, currently received video and audio are output.

The A/V parental lock method and apparatus can be applied to a broadcast signal set top box or a TV.

DETAILED DESCRIPTION OF PREFERRED EMBODIMENTS

Hereinafter, a parental lock apparatus and method using parental levels, according to the present invention, will be described in detail with reference to the appended drawings.

The parental lock apparatus and method can be applied to TVs, broadcast receivers such as set top boxes, or other various devices having a parental lock function.

Figure 1:
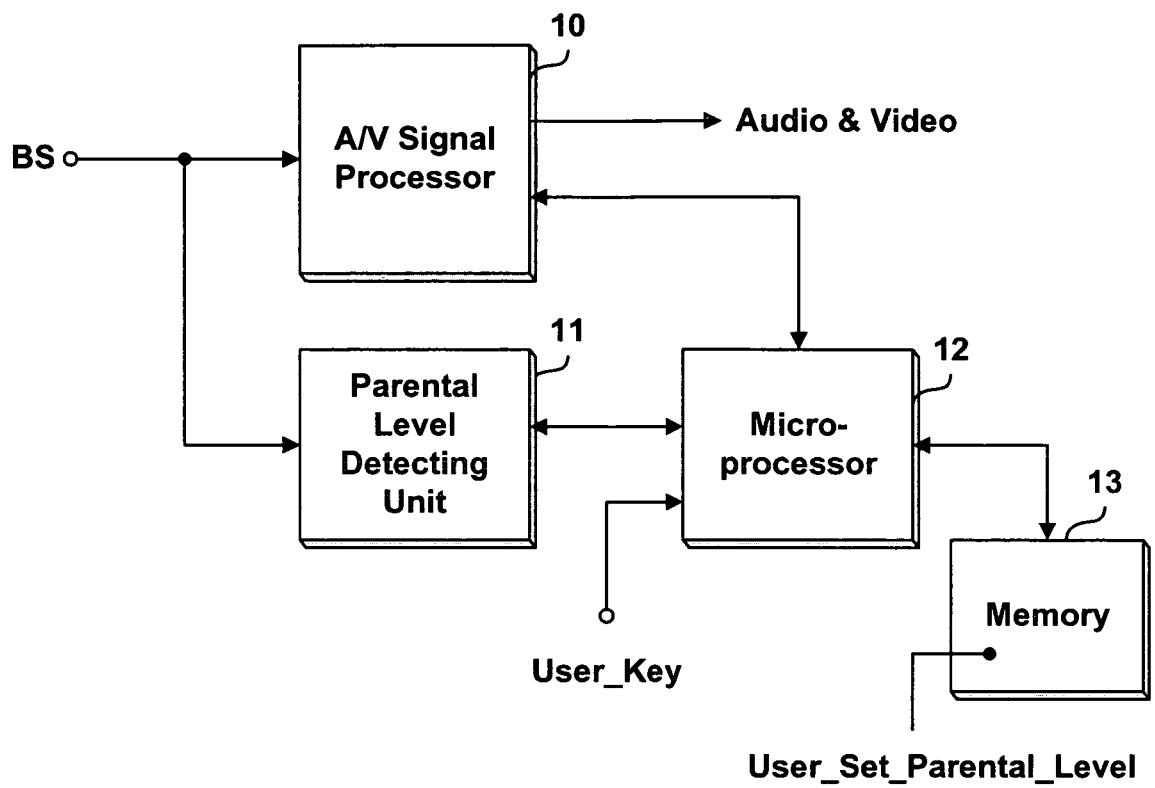
FIG. 1 illustrates a partial configuration of a general broadcast receiver.
Figure 2:
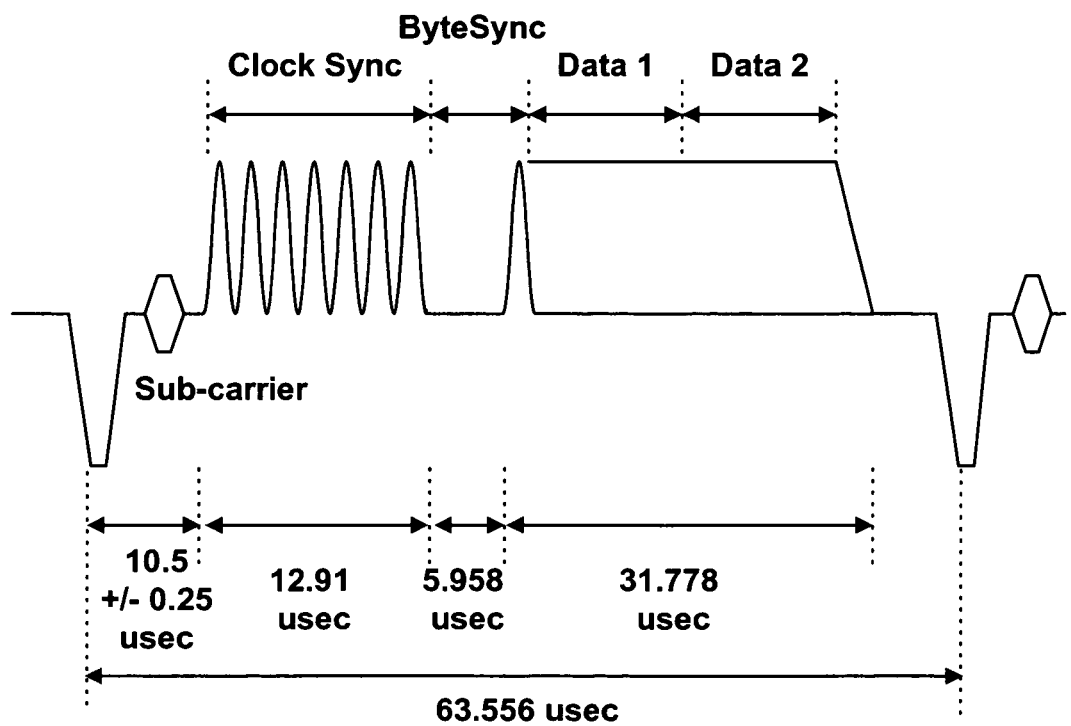
FIG. 2 illustrates an example where parental level information is included in a specific line of a video signal.
Figure 3:
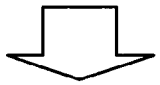
FIG. 3 illustrates an example of general parental level information.
Figure 4:
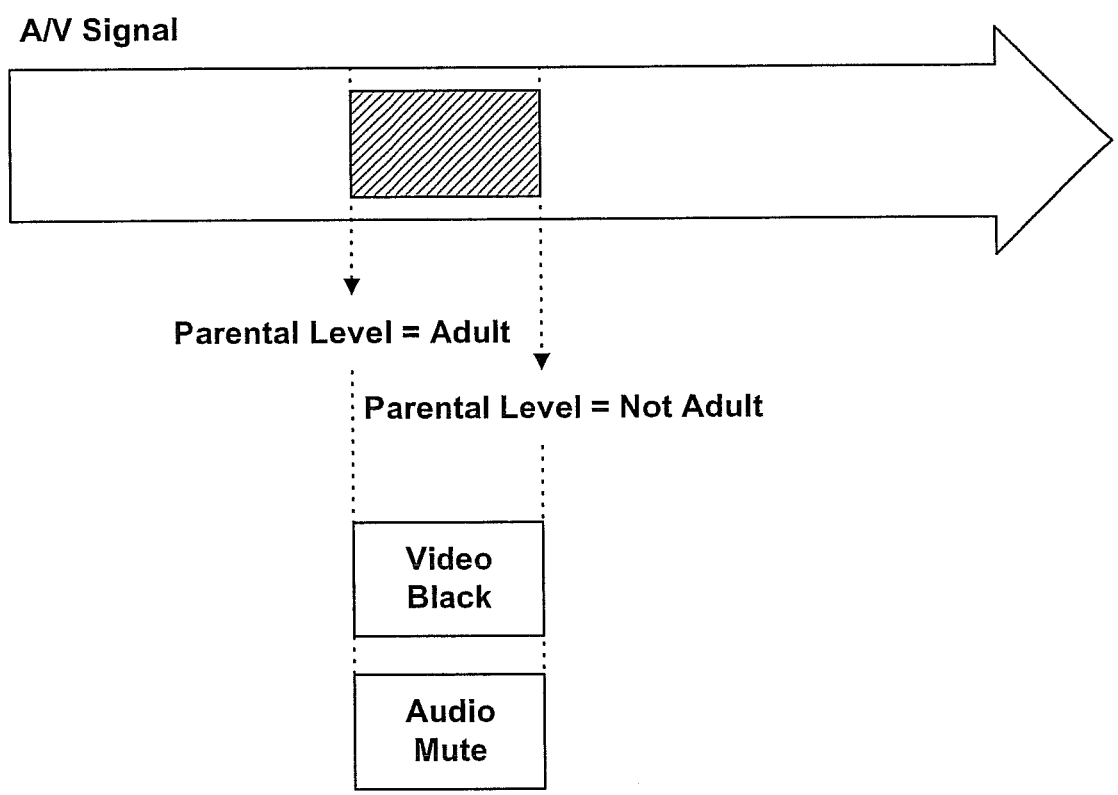
FIG. 4 is a view for explaining an A/V parental lock method using parental levels, according to a conventional art.
Figure 5:
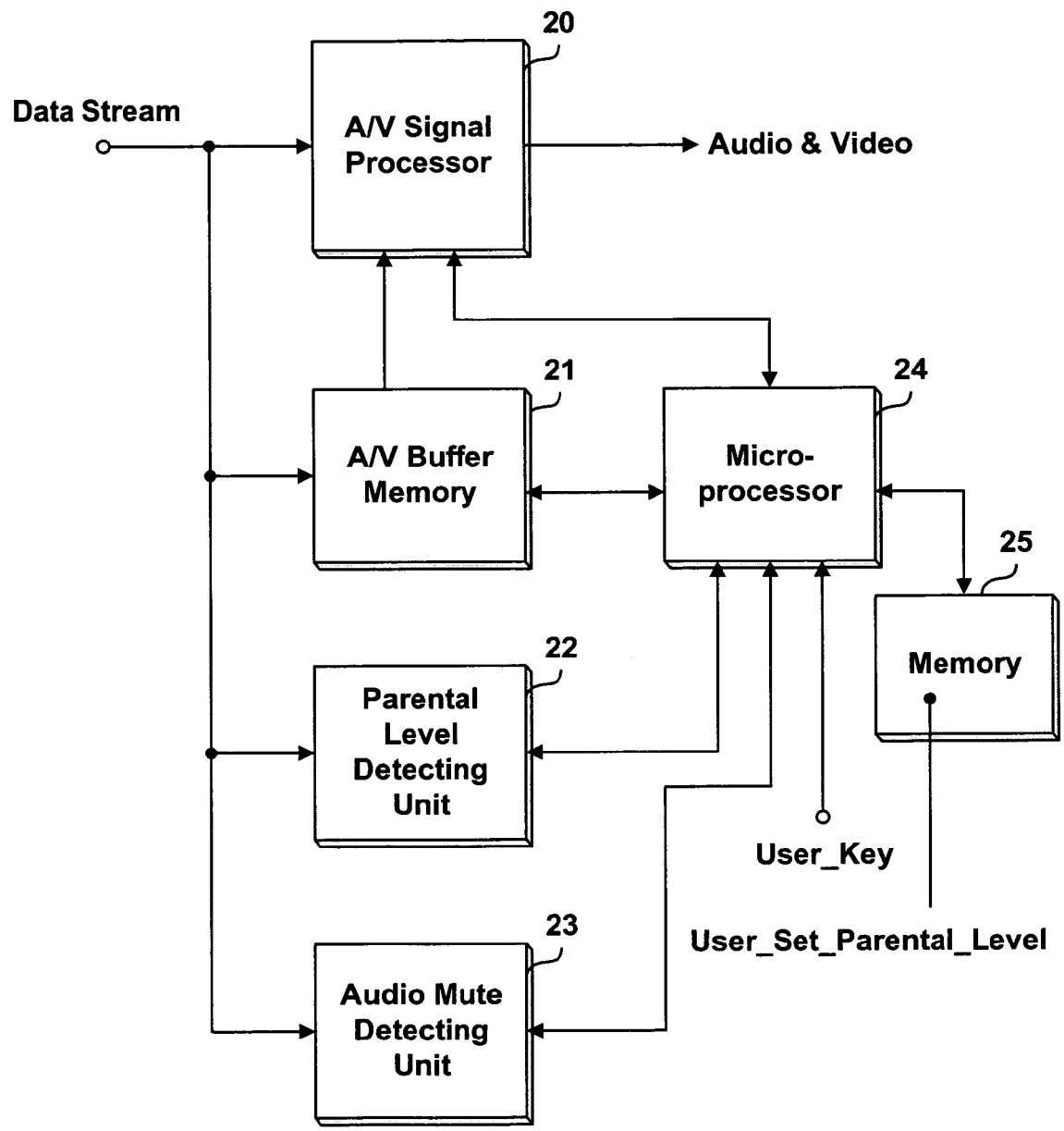
FIG. 5 illustrates a partial configuration of a broadcast receiver to which the present invention is applied.

Referring to FIG. 5, a broadcast receiver, to which the present invention is applied, includes an A/V signal processor 20, a parental level detecting unit 22, a microprocessor 24, and a memory 25. Also, the broadcast receiver can further include an A/V buffer memory 21 and an audio mute detecting unit 23.

As described above, the memory 23 stores and manages user setting parental level information set by a user. The parental level detecting unit 21 detects parental level information included in specific lines of video signals of broadcast signals received through the A/V signal processor 20, and outputs the parental level information to the microprocessor 24.

The audio mute detecting unit 23 detects mute periods of audio signals of broadcast signals received through the A/V signal processor 20. The A/V buffer memory 21 buffers and stores a video frame of the video signals as a still image and buffers and stores audio between mute periods detected by the audio mute detecting unit 23. If the A/V buffer memory 21 has a large amount of capacity, it can buffer and store moving images.

Also, the microprocessor 24 compares a parental level detected by the parental level detecting unit 21 with the user setting parental level stored in the memory 25, and determines whether or not to output video and audio of the currently received broadcast program according to the comparison result.

Figure 6:
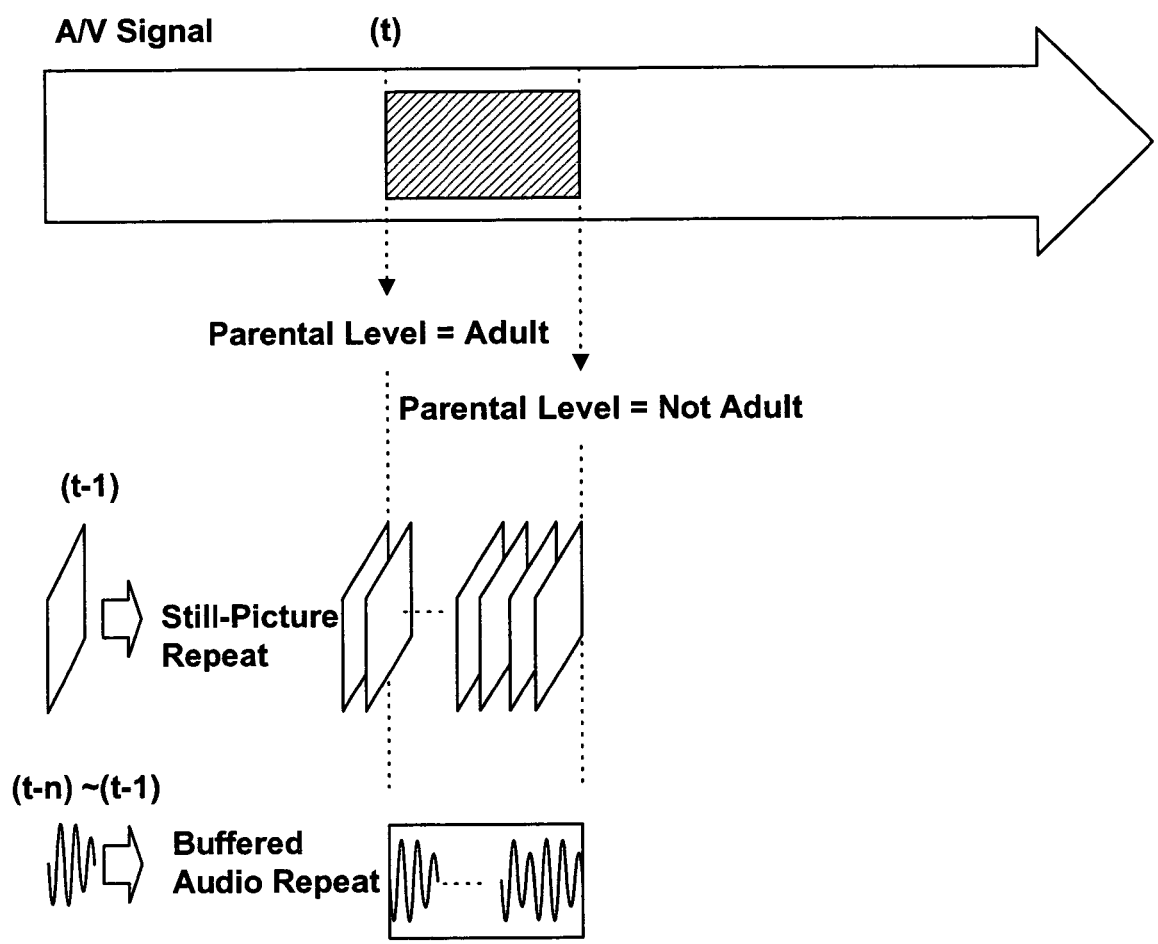
FIG. 6 is a view for explaining an A/V parental lock method using parental levels, according to an embodiment of the present invention.

For example, as illustrated in FIG. 6, if the detected parental level is an adult level higher than the user setting parental level, the microprocessor 24 controls the A/V signal processor 20 and the A/V buffer memory 21 so that the previously buffered video and audio are repeatedly output.

On the other hand, if the parental level detected by the parental level detecting unit 21 is lower than the user setting parental level, for example, if the detected parental level is not the adult level, the microprocessor 24 controls the A/V signal processor 20 so that the audio and video of the received broadcast program are normally output. This operation will be described in detail as follows.

Figure 7:
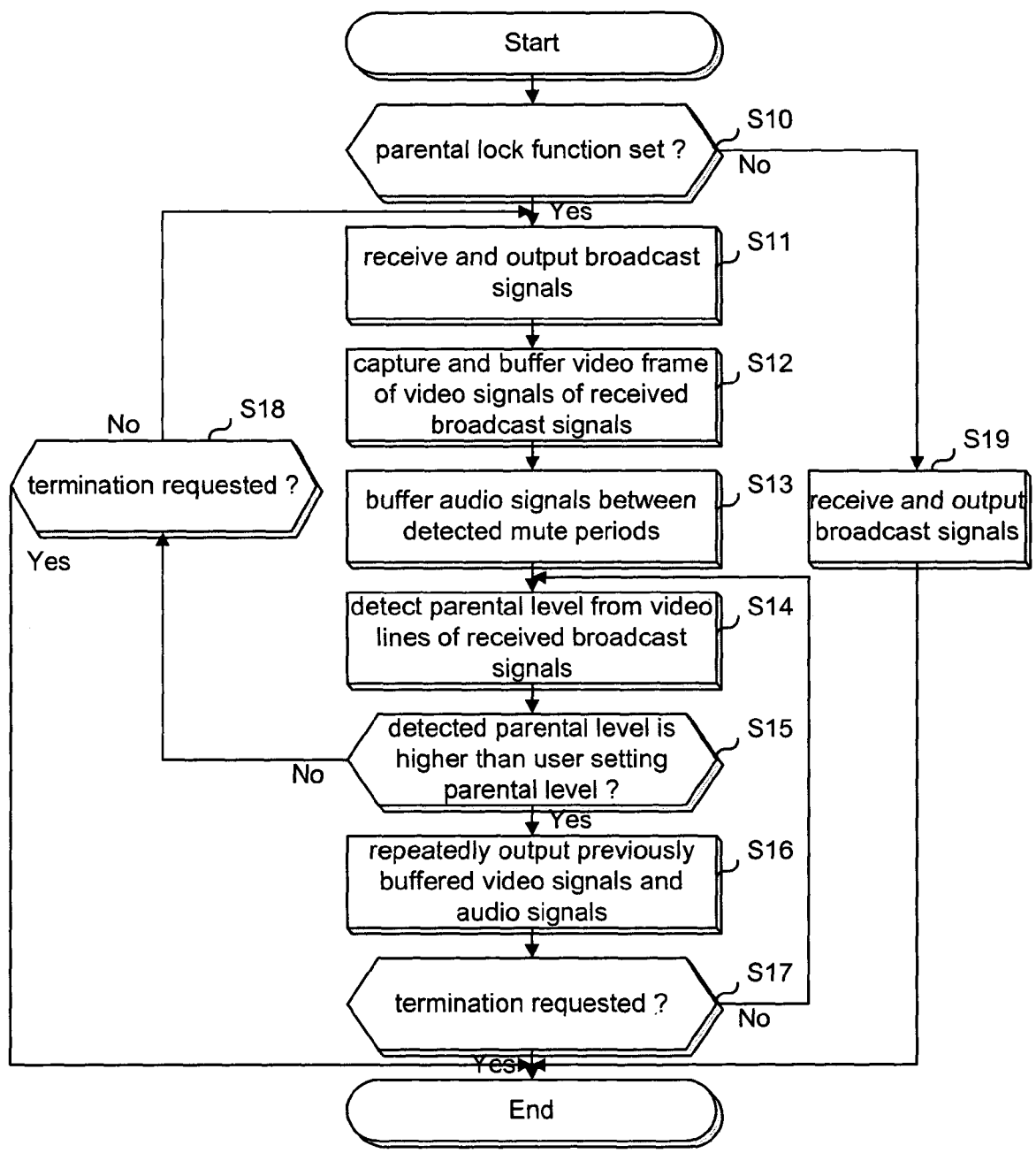
FIG. 7 is a flowchart illustrating an A/V parental lock method using parental levels, according to an embodiment of the present invention.

FIG. 7 is a flowchart illustrating an A/V parental lock method using parental levels, according to an embodiment of the present invention.

The microprocessor 24 checks whether a parental lock function is set in a current broadcast receiver (operation S10). If no parental lock function is set in the broadcast receiver, the microprocessor 24 controls the A/V signal processor 20 so that broadcast signals are received and output without restricting the output of the video and audio of broadcast programs through parental levels (operation S19).

On the other hand, if the parental lock function is set in the broadcast receiver, the microprocessor 24 compares a parental level of a broadcast program with a parental level set in the broadcast receiver, and outputs buffered video and audio instead of the video and audio of the broadcast program according to the comparison result (operations S11 through S18).

The microprocessor 24 controls the A/V signal processor 20 so that broadcast signals are received and output (operation S11).

The microprocessor 24 controls the A/V buffer memory 21 to capture a video frame of video signals of received broadcast signals and then buffer the video frame as a still image (operation S12). If the A/V buffer memory 21 has a large amount of capacity, it can buffer moving images.

Also, if the audio mute detecting unit 23 detects a mute period of audio signals of the received broadcast signals, the microprocessor 24 controls the A/V buffer memory 21 to buffer an audio signal between the detected mute period and the previously detected mute period (operation S13).

Also, the microprocessor 24 controls the A/V signal processor 20 to receive broadcast signals and simultaneously detects a parental level from a video line through the parental level detecting unit 22 (operation S14), and then compares the detected parental level with the user setting parental level stored in the memory 25 (operation S15).

If the detected parental level is higher than the user setting parental level, the microprocessor 24 controls the A/V signal processor 20 and the A/V buffer memory 21 to repeatedly output buffered audio before a final mute period while outputting the previously buffered video frame as a still image (operation S16). If the A/V buffer memory 21 stores a moving image, a buffered moving image instead of the still image can be output.

The microprocessor 24 repeatedly performs operations S14 through S16 of detecting a parental level, comparing the parental level with a stored parental level, and repeatedly reproducing buffered video and audio, until a request for terminating the output of buffered still images (or moving images) and audio is received (operation S17).

That is, since the broadcast receiver displays buffered video on a screen instead of a black screen and outputs buffered audio while a parental lock operation is performed, there is no case when a user waits for nothing while viewing a black screen in a mute state.

Meanwhile, if the detected parental level is lower than the user setting parental level, the microprocessor 24 repeatedly performs operations S11 through S14 of receiving and outputting broadcast signals, buffering the video and audio of the broadcast signals, detecting a parental level, and comparing the parental level with a stored parental level, until a request for terminating the received broadcast program is received (operation S18).

Accordingly, there is no case when a user waits for nothing while viewing a black screen in a mute state, while a parental lock function is performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for managing information, the method comprising:
   receiving an information signal, wherein the information signal includes audio and video and wherein data indicative of parental levels for different segments of the information signal is included in the information signal;
   obtaining replacement audio signals and video signals from the information signal based on an audio level of different portions of the information signal, wherein the obtaining comprises:
      detecting a first mute period and a second mute period from the audio signal of the information signal, the second mute period subsequent to the first mute period;
      storing the audio signals of a buffered segment between the detected first and second mute periods; and
      storing the video signals of the buffered segment between the detected first and second mute periods, wherein the first mute period is at a beginning of the buffered segment and the second mute period is at an end of the buffered segment;
   detecting the parental levels for the information signal;
   comparing the parental levels to a stored level;
   when the parental level detected for the information signal is lower than the stored level, outputting the audio and video of the information signal as received; and
   when the parental level detected for the information signal is equal to or greater than the stored level, identifying a segment having audio and video to be replaced and outputting stored audio and video signals of the buffered segment in place of the audio and video corresponding to the identified segment, wherein:
the stored video signals to be output in place of the video corresponding to the identified segment include a still image or moving images;
the identified segment is after the detected mute periods;
the parental level of the buffered segment between the detected mute periods is lower than the stored level; and
the detected mute periods are portions of the information signal detected, by an audio level detector, as having no sound, and wherein the storing the video signals of the buffered segment comprises:
storing moving images of the video signals when the size of an A/V buffer has a sufficient capacity for storing the moving images between the detected first and second mute periods; and
storing a still image of the video signals when the size of the A/V buffer does not have a sufficient capacity for storing the moving images between the detected first and second mute periods.

2. The method of claim 1, wherein:
the stored video signals to be output in place of the video corresponding to the identified segment include a still image, and
the still image is repeatedly output for a predetermined time.

3. The method of claim 1, wherein the stored level is set by a user.

4. The method of claim 1, wherein the data indicative of the parental levels of the information signal is included in a video line of the information signal.

5. An information management apparatus, comprising:
a storage area configured to store audio and video signals in an information signal;
a parental level detector configured to detect parental levels for different segments of the information signal, wherein data indicative of the parental levels for the different segments is included in the information signal and detected by the parental level detector;
an audio level detector configured to detect a first mute period and a second mute period from the audio signals of the information signal, the second mute period subsequent to the first mute period; and
a controller configured to
determine a buffered segment between the first mute period and the second mute period detected by the audio level detector, wherein the first mute period is at a beginning of the buffered segment and the second mute period is at an end of the buffered segment,
store audio signals from the buffered segment between the detected first and second mute periods in the storage area as replacement audio,
store video signals of the buffered segment between the detected first and second mute periods in the storage area as replacement video,
compare the parental levels detected by the parental level detector to a stored level,
output audio and video of the information signal as received when the parental level detected is lower than the stored level;
identify a segment having audio and video to be replaced when the parental level detected for the identified segment is equal to or greater than the stored level, and
output stored audio and video signals of the buffered segment in place of the audio and video corresponding to the identified segment,
wherein:
the stored video signals to be output in place of the video corresponding to the identified segment include a still image or moving images,
the identified segment is after the detected mute periods,
the parental level of the buffered segment between the detected mute periods is lower than the stored level, and
the detected mute periods are portions of the information signal, detected by the audio level detector, as having no sound, and
wherein the controller is further configured to
store moving images of the video signals when the size of an A/V buffer in the storage area has a sufficient capacity for storing the moving images between the detected first and second mute periods, and
store a still image of the video signals when the size of the A/V buffer does not have a sufficient capacity for storing the moving images between the detected first and second mute periods.

6. The apparatus of claim 5, wherein:
the stored video signals to be output in place of the video corresponding to the identified segment include a still image, and
the controller repeatedly outputs the still image for a predetermined time.

7. The apparatus of claim 5, wherein the stored level is set by a user.

8. The apparatus of claim 5, wherein the data indicative of the parental levels of the information signal is included in a video line of the information signal.

* * * * *